Patented Apr. 17, 1923.

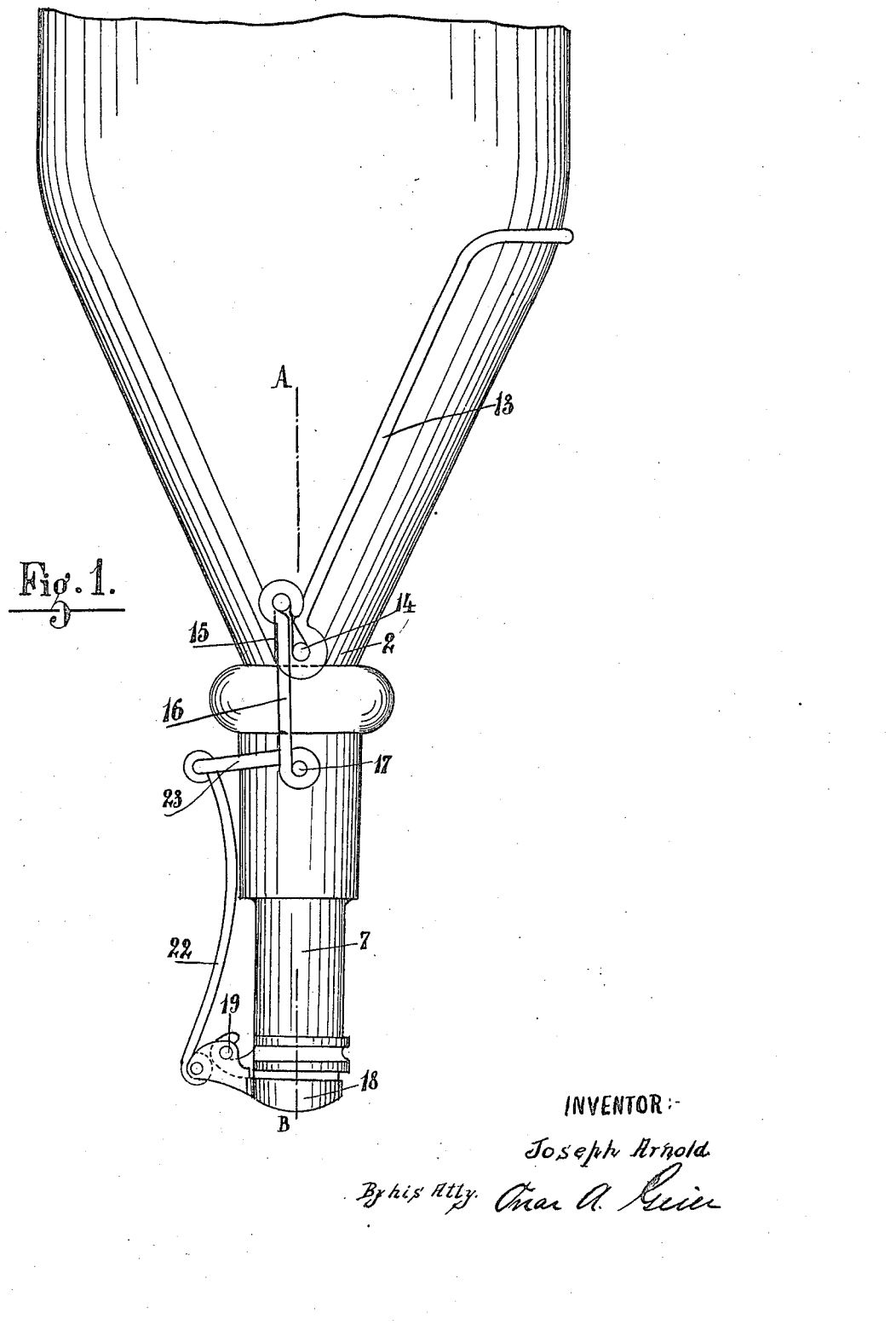

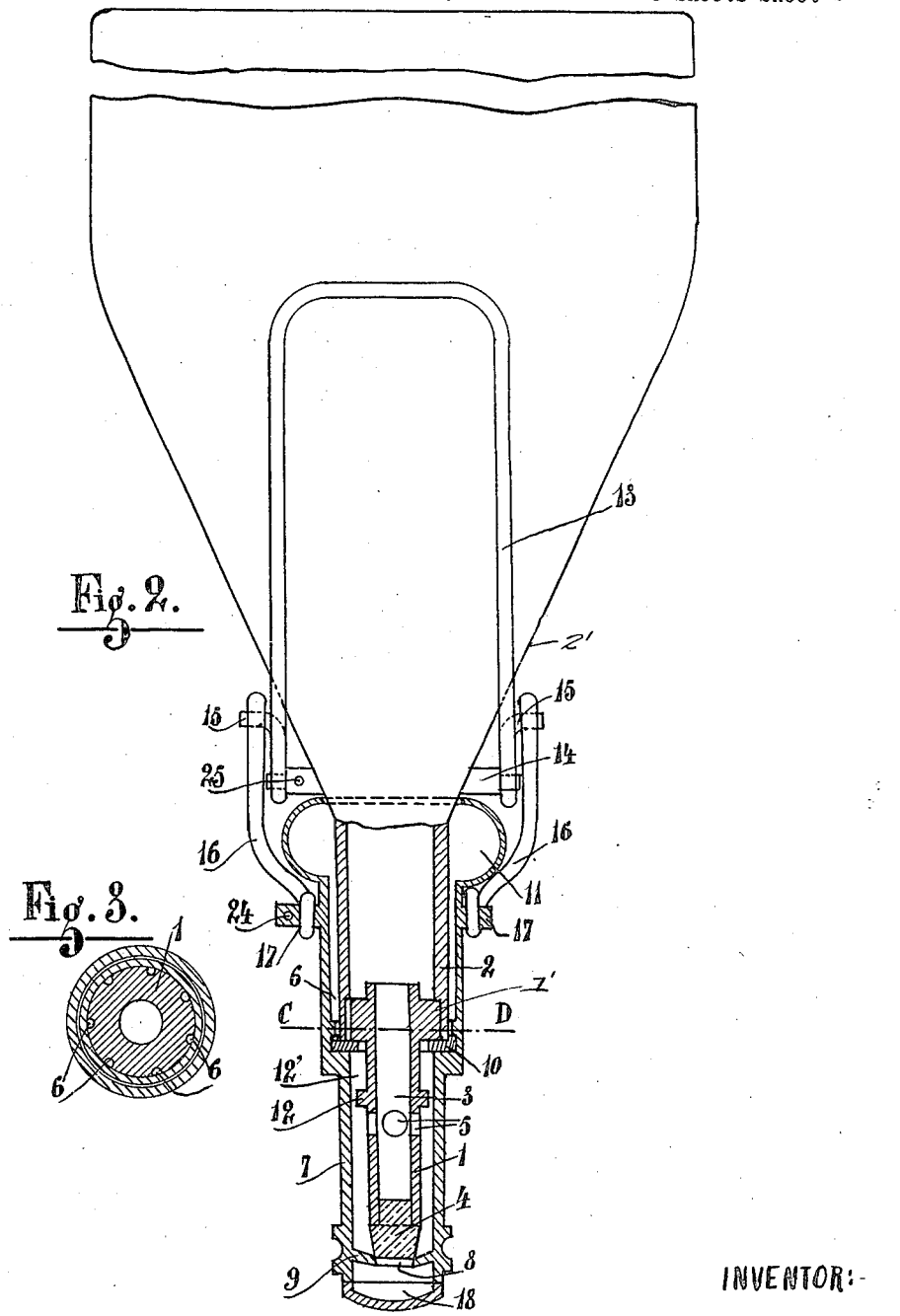

1,451,937

UNITED STATES PATENT OFFICE.

JOSEPH ARNOLD, OF GANSHOREN, NEAR BRUSSELS, BELGIUM.

DEVICE FOR THE PRESERVATION AND ASEPTIC DRAWING OFF OF LIQUIDS.

Application filed October 2, 1920. Serial No. 414,329.

*To all whom it may concern:*

Be it known that I, JOSEPH ARNOLD, a citizen of the Kingdom of Belgium, and resident of Ganshoren, near Brussels, Belgium, have invented certain new and useful Improvements in Devices for the Preservation and Aseptic Drawing Off of Liquids (for which I filed applications in Belgium, July 24, 1916; Netherlands, July 24, 1917; and England, July 9, 1920); and I do hereby declare the following to be a full, clear, and exact description of the invention, such as will enable others skilled in the art to which it appertains to make and use the same, reference being had to the accompanying drawings and to letters or figures of reference marked therein, which form a part of this specification.

The present invention has for its subject a device for the preservation and aseptic drawing off of aseptic liquids such as milk, artificial serum, etc., said device being so constructed as to be of easy and certain manipulation, as well as to effectively prevent when filling, closing or drawing off the liquid any admission of air, into the receptacle or contact of the liquid within the receptacle with germ laden air which might contaminate or alter the liquid which it is desired to preserve or draw off.

The known devices for the drawing off of liquids are generally provided with two separate openings, one of which connected usually at the lower part of the apparatus serves for the introduction of the liquid, and the other at the upper portion of the apparatus serving for the passage of air. These devices have the drawback of not permitting the effective preservation of a sterilized or aseptic liquid either after a partial drawing off or after a complete filling because of the admission of germ laden air due to inadequate provision for preserving the inlet openings in a thoroughly aseptic condition.

These inconveniences are avoided in the arrangement forming the subject of the present invention, in which arrangement the flow of the liquid and the passage of the air take place through a single tube arranged in the lower portion of the device. To this end this tube comprises two systems of conduits reserved respectively for the passage of the air and the liquid, those destined for liquid opening lower than those destined for air, and arranged in such a way as to obtain a regular flow of the liquid, solely in the conduit intended for it.

To facilitate handling, these two systems of conduits are controlled by the movement of a single closing member which can advantageously comprise a sleeve surrounding the tube. In this last case the sleeve can be arranged to form a filter chamber for the entering air, and may also be provided with suitable means to prevent all communication between the two groups of orifices at the time of filling.

In one form of construction which is particularly advantageous, the flow of the liquid takes place through a central tube around which are arranged air inlet conduits of a relatively small section.

The invention further provides for other details of construction which insure the aseptic character of the tube and simplicity in handling.

The drawings show an example of one form of carrying out the invention. In the drawings:

Figure 1 is a side view of the device.

Figure 2 is a section on the line A—B of Figure 1.

Figure 3 is a section on the line C—D of Figure 2.

Figure 4:
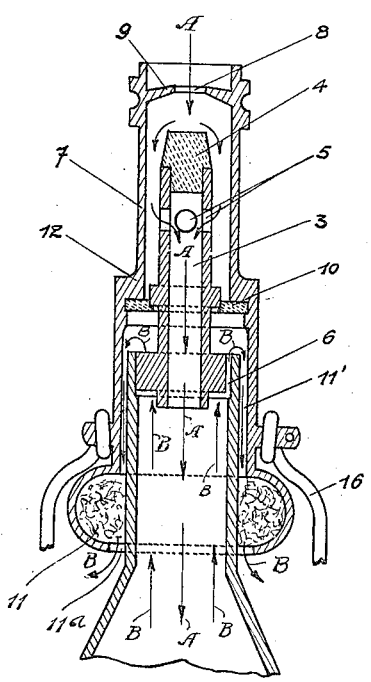
Fig. 4 is a section on the line A—B of Fig. 1 showing the device inverted and with the parts in position for filling.

In the invention as herein embodied I provide a diminished tubular member 1 having its upper end enlarged as at 1' and fixed in the discharge neck 2 of the container 2'. The member 1 has a central conduit 3 therein (for the passage of the liquid), plugged at the lower end by a fixed stopper 4 of rubber, the liquid escaping through the lateral holes 5. These holes 5 are arranged substantially lower than the lower ends of the air conduits, which latter are formed by means of grooves 6 in the periphery of the enlarged upper end 1' of the member 1.

The member 1 and neck 2 are surrounded by a vertically movable sleeve 7, said sleeve being provided with means controlling both the air and liquid conduits. To this end the sleeve 7 has at its lower portion a discharge orifice 8 arranged in an end wall 9, on the sleeve, this orifice being normally closed by the rubber stopper 4 so as to prevent the escape of the liquid. The upper portion of the sleeve, which surrounds the neck 2 is enlarged in diameter, and a rubber annulus 10 is carried in the sleeve at the lower end of this enlargement and is adapted to bear against the head 1' of member 1 and close the orifices of the air conduits 6. At its extreme upper end the sleeve may be enlarged to form an annular chamber 11 in which the wads for filtering the air (Pasteur process) entering the sleeve are placed, the top wall of the chamber being apertured as indicated by the reference character 11ᵃ.

When filling the container the communication in the sleeve 7, between the two systems of conduits should be interrupted, to this end the member 1 has an encircling flange 12 formed at its middle portion which is of less exterior diameter than the interior chamber 12' formed between said projection and the inner wall of the sleeve, the annulus 10 projecting inwardly a sufficient distance to be engaged by said flange when the sleeve is lowered sufficiently, and stop the said communication. If an attempt is made to fill the container 2' without first engaging the flange 12 and annulus 10 the liquid would flow through the orifice 8 and upwardly in the chamber 12' and through the air conduits 6; it would then pass into the filter chamber and then out of the device; the moistened filter would not allow air to pass and would give evidence of the fraudulent filling. To prevent the parts 10 and 12 being moved into contact with one another a security band is provided as will be presently set forth.

In the present embodiment, the sleeve 7 is operated to close and open the passages 6 and 8 by means of the bail-like steel wire lever 13 fulcrumed on the pivots 14 integral with the container 2'. This lever 13 has two small cranks 15 formed thereon to the ends of which are connected the ends of a bell crank yoke or bridle 16 which is connected at its apices to pivots 17 integral with the sleeve. The crank arms 15 are arranged so that when the lever 13 is lowered, the sleeve is lowered for opening the passages 6 and 8. When the lever is raised it swings against the side of the container 2' which limits its upward movement in which position the members 15 and 16 have moved slightly beyond their dead centre position, thus maintaining the lever in its raised position and holding the rubber elements 4 and 10 in tight contact with their respective orifices. The security band, before referred to, may comprise a leaded wire x connected at opposite ends to the pivots 14 and 17 which latter are shown as provided with holes for attachment of said wire which is of a length sufficient to allow of displacement of the sleeve for drawing off purposes, but insufficient to allow of the annulus 10 abutting on the projection 12.

The sleeve 7 is further provided at its lower end with a cover 18 fulcrumed as at 19 to the sleeve, with a view to preventing the contamination of the flow orifice, when the device is intended for the preservation of certain aseptic liquids, for example artificial serums. The cover may be in the form of a hollow cap to provide a chamber in which a sponge impregnated with a suitable antiseptic liquid itself coming in contact with the sleeve.

The cover is swung back as the sleeve begins its opening movement by means of the connecting link 22 connected at its lower end to an extension of the hinge ear 18' of the cover and at its upper end to the curved rod 23 forming part of the bell crank yoke 16. In view of the fact that the cranks 15 are beyond the dead point at the beginning of the movement of opening, the cover 18 is swung completely back from the discharge orifice of the sleeve 7 before the passages 6 and 8 are opened, the leverage of the parts 23 and 18' being arranged to cause a quick opening of the cover.

Figure 5:
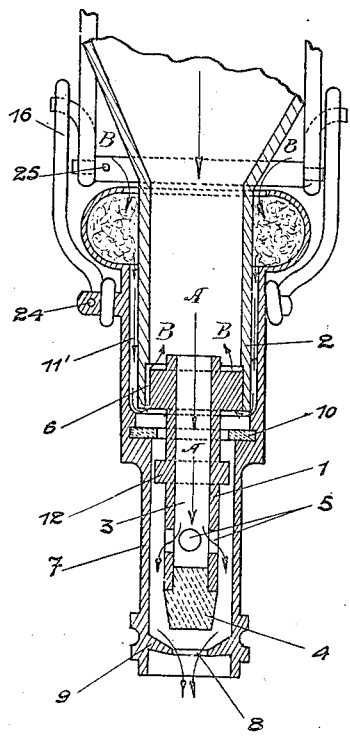
Fig. 5 is a similar section with the device in its normally up right position showing the parts in position for drawing off the liquid.

The operation of the device is as follows, when it is desired to fill the device, the lever 13 is actuated to its full extent to move the sleeve 7 to its lowermost limit, the device is inverted as shown in Fig. 5, the parts being in the position shown in this figure. The liquid is then poured into the hole 8 and passes around the space between the tube 1 and sleeve 7 from which it passes through the holes 5 into the interior of the tube 1, through which it flows to the container 2', as shown by the arrows A—A. It will be noted that the flange 12 is seated against the rubber annulus 10 and the liquid is prevented thereby from passing into the chamber 11 through the annular space 11'. The air in the container passes out through the conduits 6 into the annular space 11' and through the opening 11ᵃ in the top of the chamber 11, as shown by the arrows B—B.

When the container is closed the lever 13 is moved to the position shown in Fig. 2 from which it will be seen that the tube is moved to securely close the openings 6 and 8.

After the container is filled a small wire is passed through the holes 24, 25 and leaden seals are attached to the wire so as to limit the movement of the tube to the position shown in Fig. 5, in which position the container can be emptied but can not be refilled for the reason stated hereinbefore. In emptying the container the flow of the liquid is indicated by the arrows A—A in Fig. 5 while the flow of the incoming air through the filter pads in the chamber 11 is indicated by the arrows B. B. in Fig. 5.

What I claim is:

1. In a device for the preservation and aseptic drawing off of liquid contained in bottles and other vessels, a single tube, a central member fixed in said tube and comprising two systems of conduits communicating with the interior of the device, the one for the passage of the liquid and the other for the passage of the air, the conduits for the liquid opening lower than those for the air, a closing member comprising a sleeve for closing and opening the two systems of conduits, and a joint in said sleeve preventing all communication between the groups of conduits at the time of filling.

2. In a device for the preservation and aseptic drawing off of liquid contained in bottles and other vessels, a single tube, a central member fixed in said tube and comprising two systems of conduits communicating with the interior of the device, the one for passage of the liquid and the other for the passage of the air, the conduits for the liquid opening lower than those for the air, a closing member comprising a sleeve surrounding the whole of the conduits, means on said sleeve for closing and opening the two systems of conduits a joint in said sleeve preventing all communication between the groups of conduits at the time of filling, and an extension of said sleeve above the air orifices for forming a filter chamber.

3. In a device for the preservation and aseptic drawing off of liquid contained in bottles and other vessels, a single tube, a central member fixed in said tube and comprising two systems of conduits communicating with the interior of the device, the one for the passage of the liquid and the other for the passage of the air, the conduits for the liquid opening lower than those for the air, a sleeve surrounding the whole of the conduits and in which the conduits open, means on said sleeve for closing and opening the air conduits, a central flow orifice in said sleeve for the passage of the liquid and a plug fixed to said central member against which the central orifice abuts on closing the device.

4. In a device for the preservation and aseptic drawing off of liquid contained in bottles and other vessels, a single tube, a central member fixed in said tube and comprising two systems of conduits communicating with the interior of the device, the one for the passage of the liquid and the other for the passage of the air, the conduits for the liquid opening lower than those for the air, a closing member comprising a sleeve surrounding the whole of the conduits, means on said sleeve for closing the conduits for the liquid, and a joint in said sleeve adapted to prevent all communication between the groups of conduits at the time of filling and to serve to closure the air conduits.

5. In a device for the preservation and aseptic drawing off of liquid contained in bottles and other vessels, a single tube, a central member fixed in said tube and comprising two systems of conduits communicating with the interior of the device, the one for the passage of the liquid and the other for the passage of the air, the conduits for the liquid opening lower than those for the air, a closing member comprising a sleeve surrounding the whole of the conduits, means on said sleeve for closing and opening the two systems of conduits, a joint in said sleeve preventing all communication between the groups of conduits at the time of filling, and a movable cover at the bottom of said sleeve.

6. In a device for the preservation and aseptic drawing off of liquid contained in bottles and other vessels, a single tube, a central member fixed in said tube and comprising two systems of conduits communicating with the interior of the device the one for the passage of the liquid and the other for the passage of the air, the conduits for the liquid opening lower than those for the air, a closing member comprising a sleeve surrounding the whole of the conduits, means on said sleeve for closing and opening the two systems of conduits, a joint in said sleeve preventing all communication between the groups of conduits at the time of filling, and a single mechanism for effecting the displacement of the sleeve and of the cover.

7. In a device for the preservation and aseptic drawing off of liquid contained in bottles and other vessels, a single tube, a central member fixed in said tube and comprising two systems of conduits communicating with the interior of the device, the one for the passage of the liquid and the other for the passage of the air, the conduits for the liquid opening lower than those for the air, a closing member comprising a sleeve surrounding the whole of the conduits, means on said sleeve for closing and opening the two systems of conduits, a joint in said sleeve preventing all communication between the groups of conduits at the time of filling, and a single mechanism for effecting the displacement of the sleeve and for displacing the cover so as to completely disengage the orifice for the flow of the liquid before the opening of this orifice.

In testimony whereof I affix my signature in presence of two witnesses.

JOSEPH ARNOLD.

Witnesses:
GEORGES VANDER HUEGHEN.
LEONARD LEVA.